(12) United States Patent
Carmel-Veilleux (10) Patent No.: US 9,194,741 B2
(45) Date of Patent: Nov. 24, 2015

(54) DEVICE HAVING LIGHT INTENSITY MEASUREMENT IN PRESENCE OF SHADOWS

(71) Applicant: BLACKBERRY LIMITED, Waterloo (CA)

(72) Inventor: Tennessee Carmel-Veilleux, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 225 days.

(21) Appl. No.: 14/019,740

(22) Filed: Sep. 6, 2013

(65) Prior Publication Data
US 2015/0069921 A1    Mar. 12, 2015

(51) Int. Cl.
*G01J 1/32* (2006.01)
*G01J 1/42* (2006.01)
(Continued)

(52) U.S. Cl.
CPC ............... *G01J 1/4228* (2013.01); *G09G 3/00* (2013.01); *G09G 3/20* (2013.01); *H05B 37/02* (2013.01); *H05B 37/0218* (2013.01); *G05F 3/262* (2013.01); *G09G 2320/066* (2013.01); *G09G 2320/0626* (2013.01); *G09G 2320/0693* (2013.01); *G09G 2330/021* (2013.01); *G09G 2360/144* (2013.01)

(58) Field of Classification Search
CPC .......... G01J 1/4288; G09G 2320/0626; G09G 2360/144; G09G 2320/0686; H05B 37/02
USPC ......... 250/205, 214 R, 214.1, 214 VT, 208.1; 345/85–117; 362/231–276
See application file for complete search history.

(56) References Cited

U.S. PATENT DOCUMENTS

| | | | |
|---|---|---|---|
| 5,252,951 | A | 10/1993 | Tannenbaum et al. |
| 5,554,912 | A | 9/1996 | Thayer et al. |

(Continued)

FOREIGN PATENT DOCUMENTS

| | | | |
|---|---|---|---|
| EP | 0538705 | A1 | 4/1993 |
| EP | 2226710 | A2 | 9/2010 |
| WO | 2012140593 | A2 | 10/2012 |

OTHER PUBLICATIONS

Pyreos, "Low Power Gester Sensor Enabling Touchless Control for Mobile Devices" [online]; retrieved Jun. 6, 2013; retrieved from http://www.pyreos.com/images/downloads/Applications/Touchless%20Gesture%20Control/Gesture%20Sensor%20FAQs.pdf pp. 1-2.

(Continued)

*Primary Examiner* — Que T Le
(74) *Attorney, Agent, or Firm* — Conley Rose, P.C.; J. Robert Brown, Jr.

(57) ABSTRACT

A device and method for detecting lighting conditions to enable brightness control of a display are disclosed. The device includes a display and a first photodiode array to detect light in a visible spectrum and a non-visible spectrum that is incident on the first photodiode array. The device also includes a second photodiode array to detect light in the non-visible spectrum that is incident on the second photodiode array, and a processor to determine the lighting conditions based on a first output of the first photodiode array and a second output of the second photodiode array. The processor adjusts the first output used to determine the lighting conditions based on detecting that the first photodiode array includes a shadowed region, and controls the brightness of the display based on the lighting conditions.

20 Claims, 4 Drawing Sheets

(51) Int. Cl.
  *G09G 3/20* (2006.01)
  *G09G 3/00* (2006.01)
  *H05B 37/02* (2006.01)
  *G05F 3/26* (2006.01)

(56) References Cited

U.S. PATENT DOCUMENTS

| | | | |
|---|---|---|---|
| 5,594,469 | A | 1/1997 | Freeman et al. |
| 6,693,612 | B1 * | 2/2004 | Matsumoto et al. ............ 345/87 |
| 7,618,323 | B2 | 11/2009 | Rothschild et al. |
| 7,620,316 | B2 | 11/2009 | Boillot |
| 8,035,614 | B2 | 10/2011 | Bell et al. |
| 8,363,157 | B1 | 1/2013 | Han |
| 8,964,062 | B1 | 2/2015 | Neglur |
| 9,063,574 | B1 | 6/2015 | Ivanchenko |
| 2002/0093491 | A1 | 7/2002 | Gillespie et al. |
| 2003/0112228 | A1 | 6/2003 | Gillespie et al. |
| 2003/0156100 | A1 | 8/2003 | Gettemy |
| 2004/0178997 | A1 | 9/2004 | Gillespie et al. |
| 2004/0190776 | A1 | 9/2004 | Higaki et al. |
| 2006/0013440 | A1 | 1/2006 | Cohen et al. |
| 2006/0092142 | A1 | 5/2006 | Gillespie et al. |
| 2006/0139185 | A1 | 6/2006 | Bonnat et al. |
| 2006/0187214 | A1 | 8/2006 | Gillespie et al. |
| 2006/0279548 | A1 | 12/2006 | Geaghan |
| 2007/0075965 | A1 | 4/2007 | Huppi et al. |
| 2007/0120996 | A1 | 5/2007 | Boillot |
| 2007/0130547 | A1 | 6/2007 | Boillot |
| 2007/0259716 | A1 | 11/2007 | Mattice et al. |
| 2007/0259717 | A1 | 11/2007 | Mattice et al. |
| 2008/0005703 | A1 | 1/2008 | Radivojevic et al. |
| 2008/0041640 | A1 | 2/2008 | Gillespie et al. |
| 2008/0042994 | A1 | 2/2008 | Gillespie et al. |
| 2008/0048997 | A1 | 2/2008 | Gillespie et al. |
| 2008/0122803 | A1 | 5/2008 | Izadi et al. |
| 2008/0134102 | A1 | 6/2008 | Movold et al. |
| 2008/0165145 | A1 | 7/2008 | Herz et al. |
| 2008/0165160 | A1 | 7/2008 | Kocienda et al. |
| 2008/0168402 | A1 | 7/2008 | Blumenberg |
| 2008/0266083 | A1 | 10/2008 | Midholt et al. |
| 2009/0031258 | A1 | 1/2009 | Arrasvuori et al. |
| 2009/0051648 | A1 | 2/2009 | Shamaie et al. |
| 2009/0058830 | A1 | 3/2009 | Herz et al. |
| 2009/0074248 | A1 | 3/2009 | Cohen et al. |
| 2009/0077504 | A1 | 3/2009 | Bell et al. |
| 2009/0100383 | A1 | 4/2009 | Sunday et al. |
| 2009/0139778 | A1 | 6/2009 | Butler et al. |
| 2009/0189858 | A1 | 7/2009 | Lev et al. |
| 2009/0195497 | A1 | 8/2009 | Fitzgerald et al. |
| 2010/0027843 | A1 | 2/2010 | Wilson |
| 2010/0060611 | A1 | 3/2010 | Nie |
| 2010/0090947 | A1 | 4/2010 | Underkoffler et al. |
| 2010/0150399 | A1 | 6/2010 | Svajda et al. |
| 2010/0153996 | A1 | 6/2010 | Migos et al. |
| 2010/0156676 | A1 | 6/2010 | Mooring et al. |
| 2010/0177060 | A1 | 7/2010 | Han |
| 2010/0188328 | A1 | 7/2010 | Dodge et al. |
| 2010/0192105 | A1 | 7/2010 | Kim et al. |
| 2010/0244751 | A1 | 9/2010 | Van Endert |
| 2010/0245289 | A1 | 9/2010 | Svajda |
| 2010/0253241 | A1 | 10/2010 | Van Endert |
| 2010/0277073 | A1 | 11/2010 | Van Endert |
| 2010/0313050 | A1 | 12/2010 | Harrat et al. |
| 2010/0325575 | A1 | 12/2010 | Platzer et al. |
| 2011/0010626 | A1 | 1/2011 | Fino et al. |
| 2011/0029913 | A1 | 2/2011 | Boillot et al. |
| 2011/0096009 | A1 | 4/2011 | Kurokawa et al. |
| 2011/0140610 | A1 | 6/2011 | Van Endert |
| 2011/0157016 | A1 | 6/2011 | Chang |
| 2011/0163947 | A1 | 7/2011 | Shaw et al. |
| 2011/0167391 | A1 | 7/2011 | Momeyer et al. |
| 2011/0180709 | A1 | 7/2011 | Craddock et al. |
| 2011/0182519 | A1 | 7/2011 | Craddock et al. |
| 2011/0185309 | A1 | 7/2011 | Challinor et al. |
| 2011/0187640 | A1 | 8/2011 | Jacobsen et al. |
| 2011/0211073 | A1 | 9/2011 | Foster |
| 2011/0215733 | A1 | 9/2011 | Van Endert |
| 2011/0221666 | A1 | 9/2011 | Newton et al. |
| 2011/0221669 | A1 | 9/2011 | Shams et al. |
| 2011/0248151 | A1 | 10/2011 | Holcombe et al. |
| 2011/0248961 | A1 | 10/2011 | Svajda et al. |
| 2011/0254864 | A1 | 10/2011 | Tsuchikawa et al. |
| 2011/0291988 | A1 | 12/2011 | Bamji et al. |
| 2011/0296353 | A1 | 12/2011 | Ahmed et al. |
| 2011/0298754 | A1 | 12/2011 | Bove et al. |
| 2011/0306304 | A1 | 12/2011 | Forutanpour et al. |
| 2011/0310005 | A1 | 12/2011 | Chen et al. |
| 2011/0314429 | A1 | 12/2011 | Blumenberg |
| 2011/0314430 | A1 | 12/2011 | Blumenberg |
| 2012/0007821 | A1 | 1/2012 | Zaliva |
| 2012/0007833 | A1 | 1/2012 | Liu et al. |
| 2012/0013529 | A1 | 1/2012 | McGibney et al. |
| 2012/0013539 | A1 | 1/2012 | Hogan et al. |
| 2012/0013540 | A1 | 1/2012 | Hogan |
| 2012/0023443 | A1 | 1/2012 | Blumenberg |
| 2012/0023460 | A1 | 1/2012 | Blumenberg |
| 2012/0023461 | A1 | 1/2012 | Blumenberg |
| 2012/0023509 | A1 | 1/2012 | Blumenberg |
| 2012/0050007 | A1 | 3/2012 | Forutanpour et al. |
| 2012/0056804 | A1 | 3/2012 | Radivojevic et al. |
| 2012/0089948 | A1 | 4/2012 | Lim et al. |
| 2012/0133580 | A1 | 5/2012 | Kirby et al. |
| 2012/0162636 | A1 | 6/2012 | Sy |
| 2012/0176303 | A1 | 7/2012 | Miyake |
| 2012/0176401 | A1 | 7/2012 | Hayward et al. |
| 2012/0200486 | A1 | 8/2012 | Meinel et al. |
| 2012/0206339 | A1 | 8/2012 | Dahl |
| 2012/0242584 | A1 | 9/2012 | Tuli |
| 2012/0242852 | A1 | 9/2012 | Hayward et al. |
| 2012/0245886 | A1 | 9/2012 | Zhang et al. |
| 2012/0280107 | A1 | 11/2012 | Skurnik et al. |
| 2012/0280900 | A1 | 11/2012 | Wang et al. |
| 2012/0280904 | A1 | 11/2012 | Skurnik et al. |
| 2012/0280905 | A1 | 11/2012 | Vonog et al. |
| 2012/0281129 | A1 | 11/2012 | Wang et al. |
| 2012/0282974 | A1 | 11/2012 | Green et al. |
| 2012/0287044 | A1 | 11/2012 | Bell et al. |
| 2012/0293404 | A1 | 11/2012 | Federico et al. |
| 2012/0306815 | A1 | 12/2012 | Su et al. |
| 2012/0312956 | A1 | 12/2012 | Chang et al. |
| 2012/0317511 | A1 | 12/2012 | Bell |
| 2013/0002538 | A1 | 1/2013 | Mooring et al. |
| 2013/0002601 | A1 | 1/2013 | McCracken |
| 2013/0004016 | A1 | 1/2013 | Karakotsios et al. |
| 2013/0009896 | A1 | 1/2013 | Zaliva |
| 2013/0022214 | A1 | 1/2013 | Dickins et al. |
| 2013/0033418 | A1 | 2/2013 | Bevilacqua et al. |
| 2013/0034265 | A1 | 2/2013 | Nakasu et al. |
| 2013/0053007 | A1 | 2/2013 | Cosman et al. |
| 2013/0067419 | A1 | 3/2013 | Eltoft |
| 2013/0083252 | A1 | 4/2013 | Boyes |
| 2013/0091561 | A1 | 4/2013 | Bruso et al. |
| 2013/0093727 | A1 | 4/2013 | Eriksson et al. |
| 2013/0100036 | A1 | 4/2013 | Papakipos et al. |
| 2013/0102366 | A1 | 4/2013 | Teng et al. |
| 2013/0145535 | A1 | 6/2013 | Parsons et al. |
| 2013/0167221 | A1 | 6/2013 | Vukoszavlyev et al. |
| 2013/0182246 | A1 | 7/2013 | Tanase |
| 2013/0328761 | A1 | 12/2013 | Boulanger et al. |
| 2013/0328842 | A1 | 12/2013 | Barnhoefer et al. |
| 2014/0118257 | A1 | 5/2014 | Baldwin |
| 2014/0237432 | A1 | 8/2014 | Geurts et al. |
| 2014/0253427 | A1 | 9/2014 | Gruhlke et al. |
| 2014/0306877 | A1 | 10/2014 | Katz et al. |
| 2015/0009290 | A1 | 1/2015 | Mankowski et al. |

OTHER PUBLICATIONS

Silicon Labs, "Touchless Gesturing Brings New Innovation to Electronic Product Designs" [online]; retrieved Jun. 27, 2013; retrieved from http://www.silabs.com/Support%20Documents/TechnicalDocs/TouchlessSensorIC-WP.pdf pp. 1-4.

Taos, "Light-to-Digital Converter" The Lumenology Company, Taos132, Mar. 2012, pp. 1-24.

(56) References Cited

OTHER PUBLICATIONS

Mankowski, Peter, et al.; U.S. Appl. No. 13/932,470, filed Jul. 1, 2013; Title: Gesture Detection Using Ambient Light Sensors.
Mankowski, Peter, et al.; U.S. Appl. No. 13/932,235, filed Jul. 1, 2013; Title: Performance Control of Ambient Light Sensors.
Mankowski, Peter; U.S. Appl. No. 13/932,243, filed Jul. 1, 2013; Title: Password by Touch-Less Gesture.
Mankowski, Peter; U.S. Appl. No. 13/932,250, filed Jul. 1, 2013; Title: Touch-Less User Interface Using Ambient Light Sensors.
Mankowski, Peter, et al.; U.S. Appl. No. 13/932,487, filed Jul. 1, 2013; Title: Gesture Detection Using Ambient Light Sensors.
Mankowski, Peter, U.S. Appl. No. 13/932,260, filed Jul. 1, 2013; Title: Camera Control Using Ambient Light Sensors.
Mankowski, Peter, et al., U.S. Appl. No. 13/932,271, filed Jul. 1, 2013; Title: Display Navigation Using Tough-Less Gestures.
Mankowski, Peter; U.S. Appl. No. 13/932,280, filed Jul. 1, 2013; Title: Alarm Operation by Touch-Less Gesture.
Mankowski, Peter, et al.; U.S. Appl. No. 13/937,444, filed Jul. 9, 2013; Title: Operating a Device Using Touchless and Touchscreen Gestures.
Cheng, Heng-Tze, et al.; "Contactless Gesture Recognition System Using Proximity Sensors"; Carnegie Mellon University; http://repository.cmu.edu/silicon_valley/17/; 2010; 2 pages.
Pyreos; "Pioneering Low Power Gesture Sensor Enabling Touchless Control for Mobile Devices"; http://www.pyreos.com/images/downloads/Applications/Touchless%20Gesture%20Control/Gesture%20Sensor%20FAQs.pdf; Jun. 27, 2013; 2 pages.
Silicon Laboratories, Inc.; "Touchless Gesturing Brings New Innovation to Electronic Product Designs"; http://www.silabs.com/Support%20Documents/TechnicalDocs/TouchlessSensorIC-WP.pdf; Jun. 27, 2013; 4 pages.
Taos, Inc.; "Light-To-Digital Converter"; TSL2572; The Lumenology Company; Mar. 2012; 24 pages.
Liao, Chunyuan, et al.; "PACER: Fine-grained Interactive Paper via Camera-touch Hybrid Gestures on a Cell Phone"; CHI 2010: Displays Where You Least Expet Them; Atlanta, GA, USA; Apr. 10-15, 2010; 10 pages.
Holenarsipur, Prashanth, et al.; "Ambient-Light Sensing Optimizes Visibility and Battery Life of Portable Displays"; Maxim; Application Note 5051; Jun. 20, 2011; 7 pages.
Office Action dated Dec. 15, 2014; U.S. Appl. No. 13/932,243, filed Jul. 1, 2013; 29 pages.
Office Action dated Sep. 3, 2014; U.S. Appl. No. 13/932,260, filed Jul. 1, 2013; 48 pages.
Office Action dated Nov. 20, 2014; U.S. Appl. No. 13/932,271, filed Jul. 1, 2013; 35 pages.
Office Action dated Oct. 29, 2014; U.S. Appl. No. 13/937,444, filed Jul. 9, 2013; 28 pages.
European Extended Search Report; Application No. 13174561.4; Jan. 3, 2014; 8 pages.
European Extended Search Report; Application No. 13174565.5; Dec. 6, 2013; 7 pages.
European Extended Search Report; Application No. 13174557.2; Dec. 13, 2013; 7 pages.
European Extended Search Report; Application No. 13174558.0; Jan. 3, 2014; 10 pages.
European Extended Search Report; Application No. 13174576.2; Jan. 3, 2014; 12 pages.
European Extended Search Report; Application No. 13174577.0; Dec. 13, 2013; 8 pages.
European Extended Search Report; Application No. 13174560.6; Jan. 3, 2014; 10 pages.
European Extended Search Report; Application No. 13174575.4; Jan. 3, 2014; 9 pages.
European Extended Search Report; Application No. 13175807.0; Jan. 15, 2014; 7 pages.
European Extended Search Report; Application No. 14183709.6; Jan. 26, 2015; 7 pages.
Mankowski, Peter, et al.; U.S. Appl. No. 13/949,748, filed Jul. 24, 2013; Title: Backlight for Touchless Gesture Detection.
Mankowski, Peter, et al.; U.S. Appl. No. 13/949,727, filed Jul. 24, 2013; Title: Backlight for Touchless Gesture Detection.
EE Times; "Ambient Light Sensors Adjust LCD Brightness to Save Battery Power"; http://www.eetimes.com/document.asp?doc_id=1302779&print=yes; Dec. 26, 2006; 2 pages.
Rohm Semiconductor; "Ambient Light Sensor (ALS) Applications in Portable Electronics"; http://www.rohm.com/documents/11303/41217/CNA09016_wp.pdf; Jul. 24, 2013; 9 pages.
European Extended Search Report; Application No. 14178207.8; Dec. 23, 2014; 6 pages.
Office Action dated Jun. 2, 2015; U.S. Appl. No. 13/932,487, filed Jul. 1, 2013; 47 pages.
Final Office Action dated Mar. 4, 2015; U.S. Appl. No. 13/932,260, filed Jul. 1, 2013; 55 pages.
Final Office Action dated Mar. 31, 2015; U.S. Appl. No. 13/937,444, filed Jul. 9, 2013; 20 pages.
Office Action dated May 14, 2015; U.S. Appl. No. 13/949,748, filed Jul. 24, 2013; 50 pages.
Office Action dated Apr. 14, 2015; U.S. Appl. No. 13/949,727, filed Jul. 24, 2013; 44 pages.
Office Action dated Jun. 30, 2015; U.S. Appl. No. 13/932,470, filed Jul. 1, 2013; 51 pages.
Office Action dated Jun. 18, 2015; U.S. Appl. No. 13/932,235, filed Jul. 1, 2013; 41 pages.
Final Office Action dated Jun. 5, 2015; U.S. Appl. No. 13/932,243 filed Jul. 1, 2013; 10 pages.
Office Action dated Jun. 11, 2015; U.S. Appl. No. 13/932,250, filed Jul. 1, 2013; 53 pages.
Office Action dated Jul. 27, 2015; U.S. Appl. No. 13/932,260, filed Jul. 1, 2013; 70 pages.
Final Office Action dated Jun. 18, 2015; U.S. Appl. No. 13/932,271, filed Jul. 1, 2013; 34 pages.
Office Action dated Jun. 29, 2015; U.S. Appl. No. 13/932,280, filed Jul. 1, 2013; 45 pages.
Advisory Action dated Jun. 8, 2015; U.S. Appl. No. 13/937,444, filed Jul. 9, 2013; 6 pages.
Final Office Action dated Aug. 21, 2015; U.S. Appl. No. 13/949,727, filed Jul. 24, 2013; 17 pages.
Final Office Action dated Sep. 8, 2015; U.S. Appl. No. 13/932,243, filed Jul. 1, 2013; 14 pages.
Notice of Allowance dated Sep. 29, 2015; U.S. Appl. No. 13/932,487, filed Jul. 1, 2013; 16 pages.
Advisory Action dated Sep. 10, 2015; U.S. Appl. No. 13/932,271, filed Jul. 1, 2013; 3 pages.
Office Action dated Oct. 9, 2015; U.S. Appl. No. 13/932,280, filed Jul. 1, 2013; 13 pages.
Office Action dated Sep. 18, 2015; U.S. Appl. No. 13/937,444, filed Jul. 9, 2013; 18 pages.

* cited by examiner

DEVICE HAVING LIGHT INTENSITY MEASUREMENT IN PRESENCE OF SHADOWS

BACKGROUND

In various applications, the accurate detection of lighting conditions may be helpful. For example, most computation and communication devices such as smart phones, laptop computers, tablets, and the like, include a display. Exemplary displays may be comprised of a liquid crystal display (LCD) or organic light-emitting diodes (OLED). Because these devices may be used in different lighting conditions, the display brightness must be adjusted based on detected lighting conditions. If the display is to dim in bright conditions, it may be unreadable. Conversely, if the display is too bright for the ambient conditions, it may be uncomfortable to view. Thus, by determining the lighting conditions, the display brightness may be adjusted so as to allow a good user experience while minimizing power usage.

In an exemplary device, ambient light sensors comprise arrays of photodiodes that detect visible and infrared light (IR), and photodiodes that detect only IR light. These are utilized to determine the incident light intensity (illuminance) so that the brightness of the display can be properly adjusted. Since the ambient light sensors are typically disposed within the device, it is possible for certain incident angles of light to introduce errors into the illuminance determination due to shadowing. This effect is most pronounced when the device is used in the sun, or in dark rooms with incandescent lighting, and can cause the brightness control software to make the display too dark.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As noted above, detection of lighting conditions may be used in various applications. For example, the brightness, contrast, or both of a device display must be adjusted as lighting conditions under which the display is being viewed change. Otherwise, for example, the display will be too dim to be clearly visible or too bright to be seen comfortably. Brightness control may be achieved differently depending on the display technology used. For example, brightness-setting methods include backlighting of LCD panels with light sources behind the display and direct control of pixel intensity of OLED panels. The two related aspects of adjusting the display brightness are detecting the current lighting conditions and adjusting the display accordingly. When the detection is inaccurate for any reason, the adjustment may be compromised. For example, if the display is dimmed too much in bright lighting conditions or made too bright in dark conditions, the user experience of the user of the device suffers. Embodiments of the system and method described herein address a source of inaccuracy in detecting the current lighting conditions.

Figure 1:
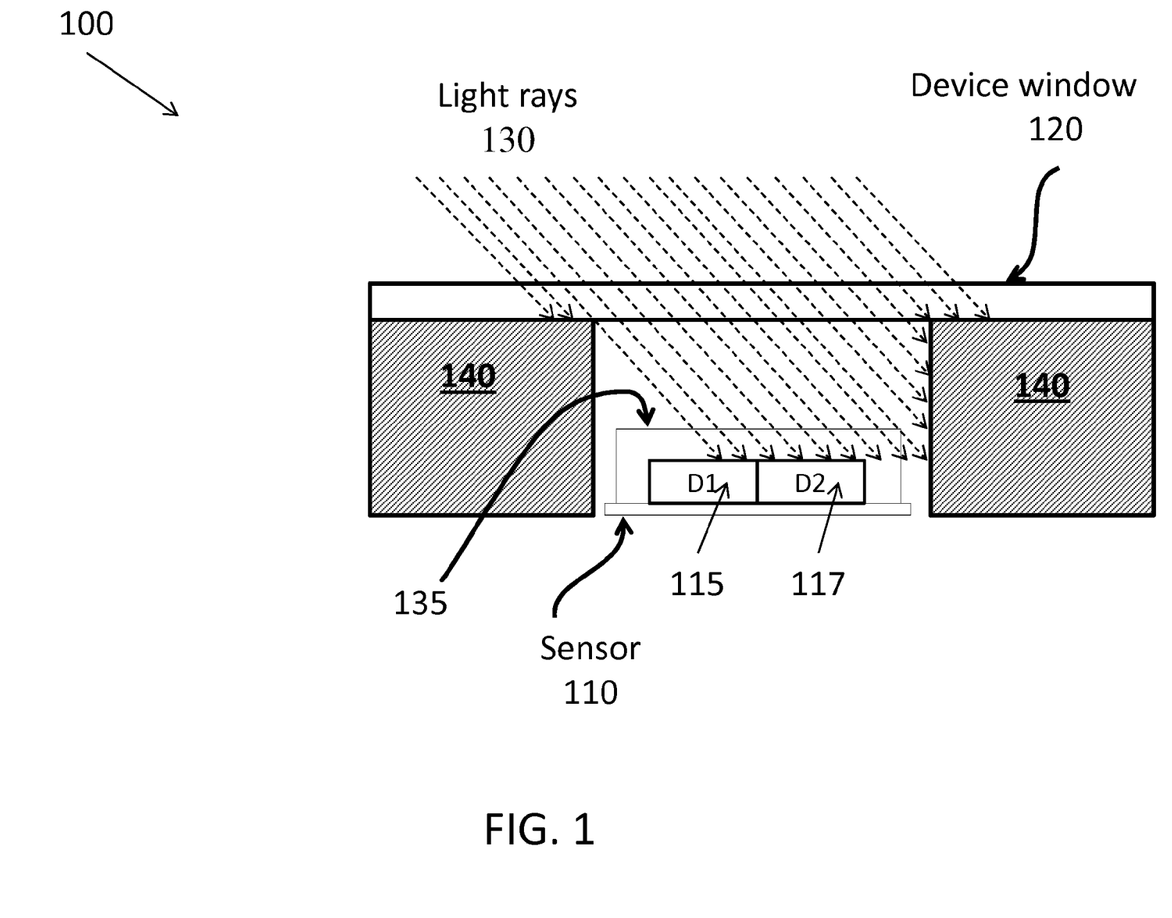
FIG. 1 is a block diagram of a cross-sectional view of a device.

FIG. 1 is a block diagram of a cross-sectional view of a device 100. While the view shown in FIG. 1 focuses on an aspect of the device 100, the device 100 may include other components (see, e.g., FIG. 4). The device 100 may be a tablet, laptop computer, smart phone, music player, storage device, and the like. The device 100 includes a housing 140. A sensor 110 within the housing 140 under a window 120 includes a first photodiode array 115 and a second photodiode array 117. The sensor 110 is an ambient light sensor that senses the available light conditions in which the device 100 is operating. Each of the first photodiode array 115 and the second photodiode array 117 detects light that is incident on the first photodiode array 115 and the second photodiode array 117, respectively, and outputs a photodiode light intensity measurement. This measurement may be a voltage or current that is proportional to the detected incident light. The measurement may also be a digital code based on converting the voltage or current using one or more analog-to-digital converters. The analog-to-digital conversion may be achieved within the sensor 110 directly or outside of the sensor within the device 100. The measurement may further be a count of photon arrival occurrences. The detected light is within a specific spectrum for each of the first photodiode array 115 and the second photodiode array 117. In the embodiment detailed herein, the first photodiode array 115 detects incident light in the visible spectrum and also in the infrared (IR) spectrum, and the second photodiode array 117 detects incident light in the IR spectrum only. In alternate embodiments, the first photodiode array 115 may detect incident light in the visible spectrum and another non-visible spectrum other than the IR spectrum, and the second photodiode array 117 may detect incident light in the other non-visible spectrum as well. As detailed with reference to FIG. 2, the non-visible spectrum detected by the first photodiode array 115 must be the same non-visible spectrum detected by the second photodiode array 117 in order to accurately detect the lighting conditions.

FIG. 1 depicts incident light rays 130 at an angle that results in a shadowed region 135 of the first photodiode array 115. That is, due to the angle of incident light rays 130 and the placement of the first photodiode array 115 within the housing 140, a portion of the first photodiode array 115 (in the shadowed region 135) does not receive any of the incident light rays 130 and, therefore, does not contribute to the output current or voltage. This leads to a lower output response from the first photodiode array 115 (an output that is not proportional to the true lighting condition) than if the shadowed region 135 did not exist (e.g., when the light rays 130 have a different angle of incidence). The effect of the shadowed region 135 on the accurate detection of lighting conditions is detailed with reference to FIG. 2.

Figure 2:
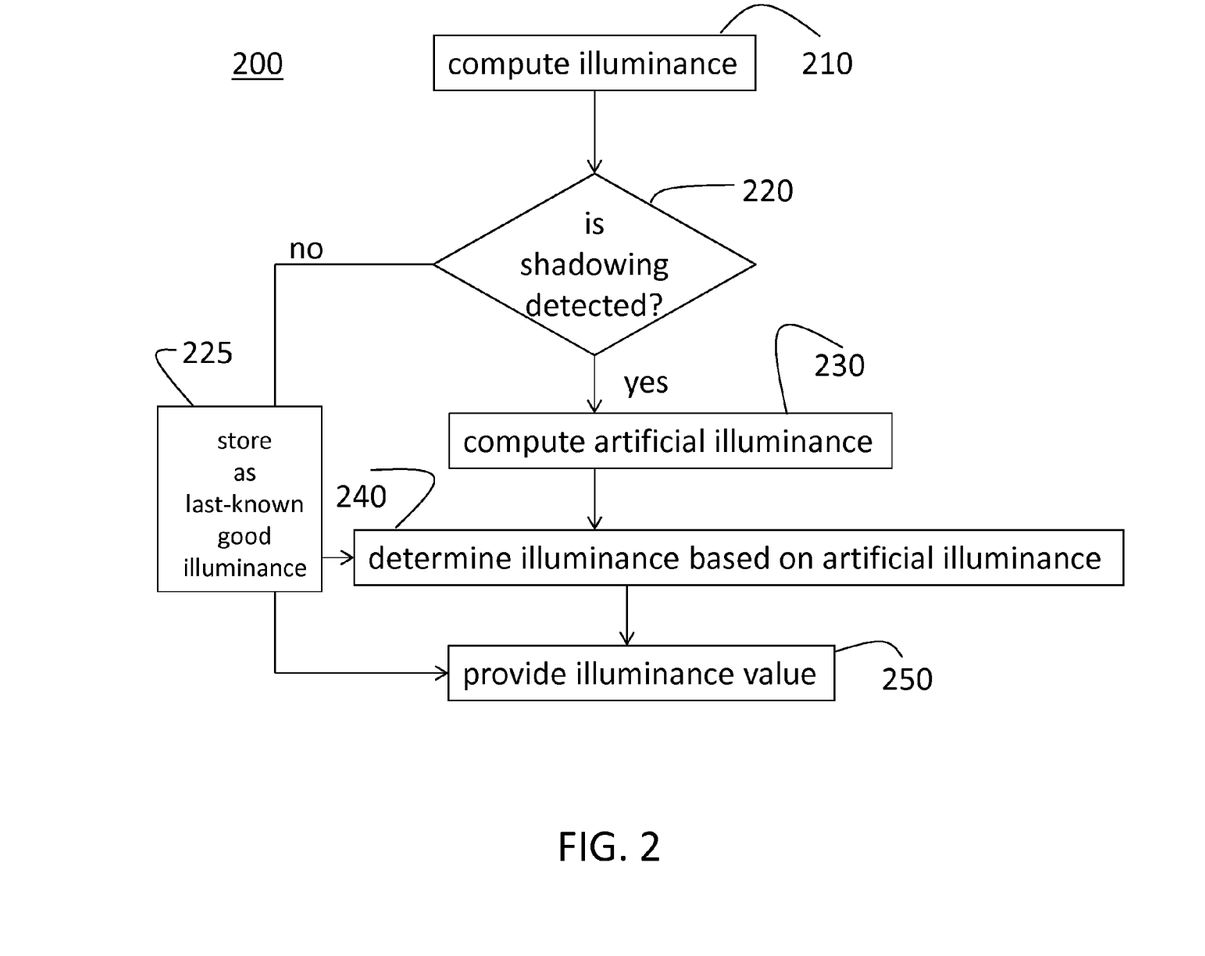
FIG. 2 is a process flow diagram of a method of detecting the lighting conditions according to an exemplary embodiment of the disclosure.

FIG. 2 is a process flow diagram of a method 200 of detecting the lighting conditions according to an exemplary embodiment of the disclosure. At block 210, computing illuminance includes an IR subtraction method which involves subtracting an output of the second photodiode array 117 (which detects incident light in the IR spectrum only) from an output of the first photodiode array 115 (which detects incident light in the visible and IR spectrums). The two output values are weighted so that, ideally, the IR spectrum contribution is subtracted out and only the visible spectrum contribution remains (voltage or current) for conversion to a photometric unit (lux) indicating lumens per square meter or, alternatively, a radiometric unit (irradiance) indicating watts per square meter. In the ideal case in which no shadowed region 135 of the first photodiode array 115 is present, the calculated illuminance indicating current lighting conditions may be used to adjust brightness, contrast, or both of a display of a computation or communication device, for example. The computation of illuminance (I) is given by:

$$I = K1*output1 - K2*output2 \quad [\text{EQ 1}]$$

K1 and K2 are weighting factors and output1 and output2 are the photodiode light intensity measurements from the first photodiode array 115 and the second photodiode array 117, respectively. The weighting factors K1 and K2 may be based on the device 100 and additionally or alternately on the ratio of output2 (the output of the IR-only second photodiode array 117) to output1 (the output of the visible and IR first photodiode array 115). The values of K1 and K2 may be determined by a calibration process, for example. The values of K1 and K2 are calibrated to account for the difference between the first photodiode array 115 and the second photodiode array 117 such that the IR portion of the first photodiode array 115 output is subtracted out by subtracting the second photodiode array 117 output. As noted above, the photodiode light intensity measurement from the first photodiode array 115 and the second photodiode array 117 may be in the form of a current, a voltage, a digital code, or a photon count, for example. Thus, the values of K1 and K2 may reflect a conversion in addition to the weighting. That is, for example, when the photodiode light intensity measurement is provided as a voltage, K1 and K2 may have a unit of lux per voltage so that the illuminance (I) resulting from EQ. 1 is in units of lux.

As EQ. 1 makes clear, when the shadowed region 135 prevents output1 from being as high a value as it should be (were it not for the shadowing effect caused by the angle of incidence of the light rays 130), the illuminance determined by EQ. 1 may be artificially low or even a negative value (depending on the size of the shadowed region 135 and the value of factors K1 and K2). If the angle of incidence of the light rays 130 were different than the angle shown in FIG. 1, such that the shadowed region 135 were on the second photodiode array 117 rather than on the first photodiode array 115, then the IR-only detected incident light (output2 in EQ. 1) would be lower than it should be. While this condition would prevent all of the IR contribution from being subtracted out based on EQ. 1 (because the IR level detected by the first photodiode array 115 would be greater than the IR level detected by the second photodiode array 117), a negative value would not result for the illuminance (as shown by EQ. 1). The focus of the method described with reference to FIG. 2 is on the shadowed region 135 being on the first photodiode array 115 rather than on the second photodiode array 117.

At block 220, determining whether shadowing is detected may be done in one of several ways. When the illuminance computed at block 210 (using EQ. 1) is zero or a negative value, shadowing may be assumed. The ratio of the converted second photodiode array 117 output (in lux, for example) to the computed illuminance (at block 210) may also be used to determine shadowing. The ratio is calculated as:

$$\text{ratio} = \frac{output2}{I} \quad [\text{EQ. 2}]$$

When this ratio is greater than a threshold ratio (because the first photodiode array 115 output and, thus, the illuminance calculation is artificially low due to the shadowed region 135), shadowing may be indicated. The threshold ratio may be selected based on the device as well as output2. Additionally, shadowing may be indicated when the second photodiode array 117 output (converted to lux, for example) exceeds an IR signal threshold. The IR signal threshold may be checked if the threshold ratio is exceeded. When shadowing is not detected, the illuminance computed at block 210 is provided as the illuminance value, at block 250, that may be used to adjust the display brightness, for example. In addition, the illuminance computed at block 210 is provided at block 225 as the last-known good illuminance. This value is used at block 240, as described below, the next time that a shadowed region 135 is detected on the first photodiode array 115. When shadowing is detected, an artificial illuminance is computed at block 230.

At block 230, computing the artificial illuminance includes using EQ. 1 again with an artificial output1 value. That is, first the artificial output1 is determined as:

$$\text{artificial\_output1} = \frac{output2}{\text{artificial\_ratio}} \quad [\text{EQ. 3}]$$

The artificial ratio may be determined through calibration, for example. EQ. 1 is then used again to determine an artificial illuminance using artificial output1 and output2. When K1 and K2 are not based only on the device, K1 and K2 may be re-selected to determine the artificial illuminance (using EQ. 1) based on the artificial ratio.

At block 240, determining the illuminance value to be provided (block 250) is based on the artificial illuminance and includes using either a linear or a non-linear combination of the last-known good illuminance value (computed at block 210 and stored at block 225) and the artificial illuminance (determined at block 230). According to one embodiment, the illuminance value that is provided at block 250 may be determined at block 240 as the maximum of the last-known good illuminance value or the artificial illuminance value.

Figure 3:
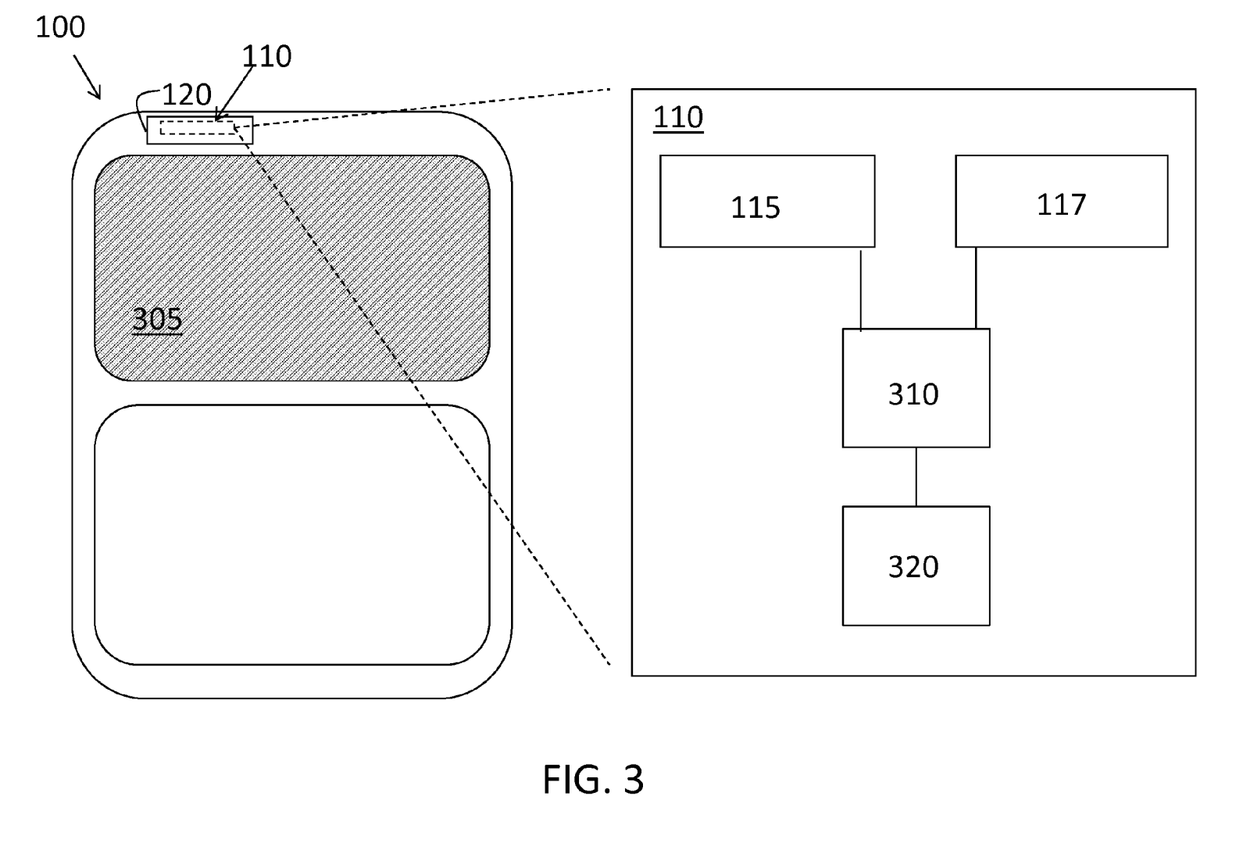
FIG. 3 is a block diagram of a sensor of the device of FIG. 1 according to an exemplary embodiment.

FIG. 3 is a block diagram of the sensor 110 of the device 100 of FIG. 1 according to an exemplary embodiment. The sensor 110 is arranged below a window 120 and includes the first photodiode array 115 and the second photodiode array 117 as shown in FIG. 1. The sensor 110 may also include one or more processors 310 and one or more memory devices 320. The processor 310 (e.g., application specific integrated circuit (ASIC), microprocessor) may execute instructions stored in the memory device 320 to compute illuminance and the other values (e.g., ratio, artificial output1) discussed above. The memory device 320 may also include the threshold values, artificial ratio values, and K1 and K2 values discussed above. In alternate embodiments, the processing described above to determine the illuminance value to be provided for adjustment of the display in the window 305, for example, may be done by one or more processors (e.g., 401, FIG. 4) and memory devices (e.g., 402, FIG. 4) of the device 100 that also perform other device functions.

Figure 4:
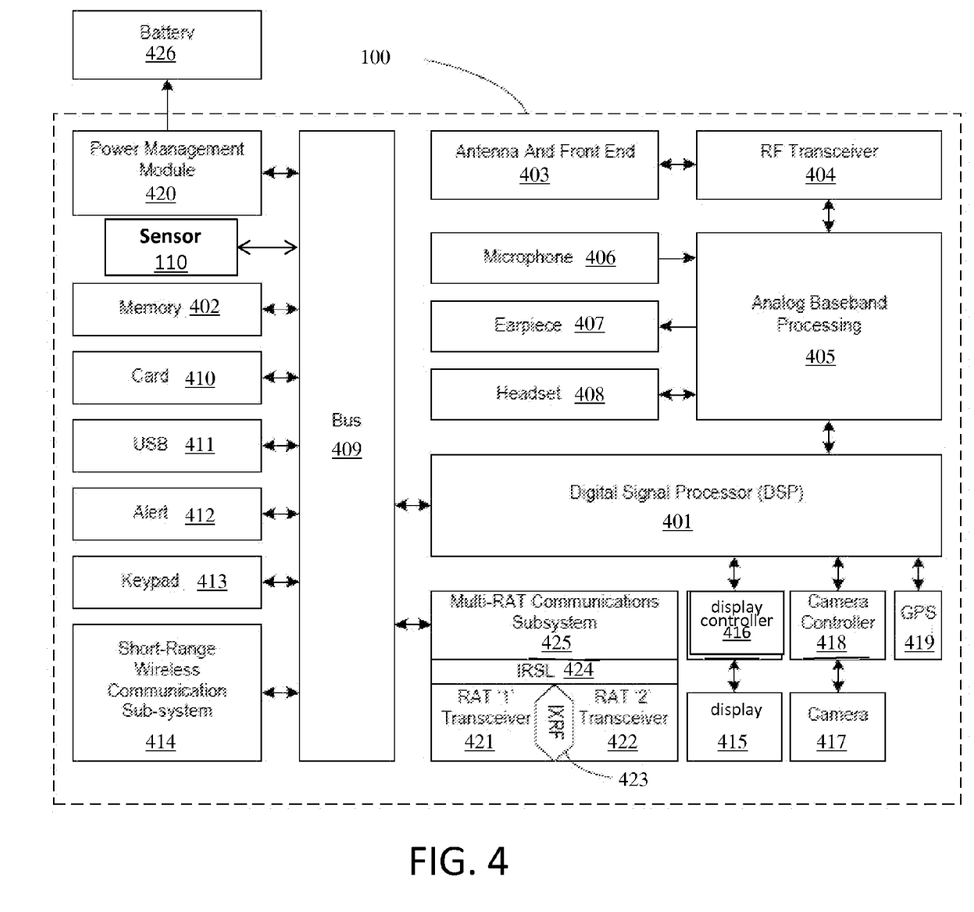
FIG. 4 is a block diagram of an exemplary device configured to perform detection of lighting conditions according to embodiments discussed herein.

FIG. 4 is a block diagram of an exemplary device 100 configured to perform detection of lighting conditions according to embodiments discussed above with reference to FIG. 2. While various components of the device 100 are depicted, alternate embodiments of the device 100 may include a subset of the components shown or include additional components not shown in FIG. 4. The device 100 includes a general purpose digital signal processor or DSP 401 and a memory 402. The DSP 401 and memory 402 may provide, in part or in whole, the functionality of the processor 310 and memory device 320 of the sensor 110 discussed above. As shown, the device 100 may further include an antenna and front-end unit 403, a radio frequency (RF) transceiver 404, an analog baseband processing unit 405, a microphone 406, an earpiece speaker 407, a headset port 408, a bus 409, such as a system bus or an input/output (I/O) interface bus, a removable memory card 410, a universal serial bus (USB) port 411, an alert 412, a keypad 413, a short range wireless communication sub-system 414, a liquid crystal display (LCD) 415, which may include a touch sensitive surface, an LCD controller 416, a charge-coupled device (CCD) camera 417, a camera controller 418, and a global positioning system (GPS) sensor 419, and a power management module 420 operably coupled to a power storage unit, such as a battery 426. In various embodiments, the device 100 may include another kind of display that does not provide a touch sensitive screen. In one embodiment, the DSP 401 communicates directly with the memory 402 without passing through the input/output interface ("Bus") 409.

In various embodiments, the DSP 401 or some other form of controller or central processing unit (CPU) operates to control the various components of the device 100 in accordance with embedded software or firmware stored in memory 402 or stored in memory contained within the DSP 401 itself. In addition to the embedded software or firmware, the DSP 401 may execute other applications stored in the memory 402 or made available via information media such as portable data storage media like the removable memory card 410 or via wired or wireless network communications. The application software may comprise a compiled set of machine-readable instructions that configure the DSP 401 to provide the desired functionality, or the application software may be high-level software instructions to be processed by an interpreter or compiler to indirectly configure the DSP 401.

The antenna and front-end unit 403 may be provided to convert between wireless signals and electrical signals, enabling the device 100 to send and receive information from a cellular network or some other available wireless communications network or from a peer device 100. In an embodiment, the antenna and front-end unit 403 may include multiple antennas to support beam forming and/or multiple input multiple output (MIMO) operations. As is known to those skilled in the art, MIMO operations may provide spatial diversity, which can be used to overcome difficult channel conditions or to increase channel throughput. Likewise, the antenna and front-end unit 403 may include antenna tuning or impedance matching components, RF power amplifiers, or low noise amplifiers.

In various embodiments, the RF transceiver 404 facilitates frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 405 or the DSP 401 or other central processing unit. In some embodiments, the RF Transceiver 404, portions of the antenna and front-end unit 403, and the analog base band processing unit 405 may be combined in one or more processing units and/or application specific integrated circuits (ASICs).

Note that, in this diagram, the radio access technology (RAT) RAT1 and RAT2 transceivers 421, 422, the IXRF 423, the IRSL 424 and Multi-RAT subsystem 425 are operably coupled to the RF transceiver 404 and analog baseband processing unit 405 and then also coupled to the antenna and front-end unit 403 via the RF transceiver 404. As there may be multiple RAT transceivers, there will typically be multiple antennas or front ends 403 or RF transceivers 404, one for each RAT or band of operation.

The analog baseband processing unit 405 may provide various analog processing of inputs and outputs for the RF transceivers 404 and the speech interfaces (406, 407, 408). For example, the analog baseband processing unit 405 receives inputs from the microphone 406 and the headset 408 and provides outputs to the earpiece 407 and the headset 408. To that end, the analog baseband processing unit 405 may have ports for connecting to the built-in microphone 406 and the earpiece speaker 407 that enable the device 100 to be used as a cell phone. The analog baseband processing unit 405 may further include a port for connecting to a headset or other hands-free microphone and speaker configuration. The analog baseband processing unit 405 may provide digital-to-analog conversion in one signal direction and analog-to-digital conversion in the opposing signal direction. In various embodiments, at least some of the functionality of the analog baseband processing unit 405 may be provided by digital processing components, for example by the DSP 401 or by other central processing units.

The DSP 401 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 401 may perform modulation, coding, interleaving, and spreading, and for a receiver function the DSP 401 may perform despreading, deinterleaving, decoding, and demodulation. In another embodiment, for example in an orthogonal frequency division multiplex access (OFDMA) technology application, for the transmitter function the DSP 401 may perform modulation, coding, interleaving, inverse fast Fourier transforming, and cyclic prefix appending, and for a receiver function the DSP 401 may perform cyclic prefix removal, fast Fourier transforming, deinterleaving, decoding, and demodulation. In other wireless technology applications, yet other signal processing functions and combinations of signal processing functions may be performed by the DSP 401.

The DSP 401 may communicate with a wireless network via the analog baseband processing unit 405. In some embodiments, the communication may provide Internet connectivity, enabling a user to gain access to content on the Internet and to send and receive e-mail or text messages. The input/output interface ("Bus") 409 interconnects the DSP 401 and various memories and interfaces. The memory 402 and the removable memory card 410 may provide software and data to configure the operation of the DSP 401. Among the interfaces may be the USB interface 411 and the short range wireless communication sub-system 414. The USB interface 411 may be used to charge the device 100 and may also enable the device 100 to function as a peripheral device to exchange information with a personal computer or other computer system. The short range wireless communication sub-system 414 may include an infrared port, a Bluetooth interface, an IEEE 802.11 compliant wireless interface, or any other short range wireless communication sub-system, which may enable the device to communicate wirelessly with other nearby client nodes and access nodes. The short-range wireless communication sub-system 414 may also include suitable RF Transceiver, Antenna and Front End subsystems.

The input/output interface ("Bus") 409 may further connect the DSP 401 to the alert 412 that, when triggered, causes the device 100 to provide a notice to the user, for example, by ringing, playing a melody, or vibrating. The alert 412 may serve as a mechanism for alerting the user to any of various events such as an incoming call, a new text message, and an appointment reminder by silently vibrating, or by playing a specific pre-assigned melody for a particular caller.

The keypad 413 couples to the DSP 401 via the I/O interface ("Bus") 409 to provide one mechanism for the user to make selections, enter information, and otherwise provide input to the device 100. The keypad 413 may be a full or reduced alphanumeric keyboard such as QWERTY, DVORAK, AZERTY and sequential types, or a traditional numeric keypad with alphabet letters associated with a telephone keypad. The input keys may likewise include a track wheel, track pad, an exit or escape key, a trackball, and other navigational or functional keys, which may be inwardly depressed to provide further input function. Another input mechanism may be the LCD 415, which may include touch screen capability and also display text and/or graphics to the user. The display controller 416 couples the DSP 401 to the display 415. In alternate embodiments, the display 415 may be, for example, an LED or an OLED built-in display in the device 100.

The camera 417 (e.g., CMOS camera), if equipped, enables the device 100 to make digital pictures. The DSP 401 communicates with the camera 417 via the camera controller 418. In another embodiment, a camera implemented as a Charge Coupled Device (CCD) camera may be employed. The GPS sensor 419 is coupled to the DSP 401 to decode global positioning system signals or other navigational signals, thereby enabling the device 100 to determine its position. The GPS sensor 419 may be coupled to an antenna and front end (not shown) suitable for its band of operation. Various other peripherals may also be included to provide additional functions, such as radio and television reception.

In various embodiments, device 100 comprises a first Radio Access Technology (RAT) transceiver 421 and a second RAT transceiver 422. As shown in FIG. 4, the RAT transceivers '1' 421 and '2' 422 are in turn coupled to a multi-RAT communications subsystem 425 by an Inter-RAT Supervisory Layer Module 424. In turn, the multi-RAT communications subsystem 425 is operably coupled to the Bus 409. Optionally, the respective radio protocol layers of the first Radio Access Technology (RAT) transceiver 421 and the second RAT transceiver 422 are operably coupled to one another through an Inter-RAT eXchange Function (IRXF) Module 423.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An electronic device, comprising:
a display;
a first photodiode array configured to detect light in a visible spectrum and a non-visible spectrum that is incident on the first photodiode array;
a second photodiode array configured to detect light in the non-visible spectrum that is incident on the second photodiode array; and
a processor configured to determine lighting conditions and to control brightness of the display based on a first output of the first photodiode array and a second output of the second photodiode array, the processor adjusting the first output used to determine the lighting conditions based on detecting that the first photodiode array includes a shadowed region.

2. The device according to claim 1, wherein the first output is proportional to the light in the visible spectrum and the non-visible spectrum that is incident on the first photodiode array and the second output is proportional to the light in the non-visible spectrum that is incident on the second photodiode array.

3. The device according to claim 1, wherein the processor determines a difference between the first output and the second output, the difference being based on a subtraction of the second output from the first output.

4. The device according to claim 3, wherein the difference is the subtraction of the second output, multiplied by a second factor, from the first output, multiplied by a first factor, the first factor and the second factor being determined based on a calibration.

5. The device according to claim 3, wherein the processor detects that the first photodiode array includes the shadowed region based on the difference being zero or a negative value.

6. The device according to claim 3, wherein the processor determines an illuminance in lumens per square meter (lux) based on the difference between the first output and the second output and outputs the illuminance as the lighting conditions unless the processor detects that the first photodiode array includes the shadowed region.

7. The device according to claim 6, wherein the processor detects that the first photo diode array includes the shadowed region based on a ratio of the second output to the illuminance exceeding a ratio threshold.

8. The device according to claim 7, wherein the processor detects that the first photodiode array includes the shadowed region based additionally on the second output exceeding an output threshold.

9. The device according to claim 1, wherein the processor adjusts the first output used to determine the lighting conditions to be a ratio of the second output to an artificial ratio, the artificial ratio being determined based on a calibration.

10. A non-transitory computer readable medium storing instructions which, when processed by a processor, cause the processor to execute a method of detecting lighting conditions, the method comprising:
receiving a first output from a first photodiode array that is proportional to light in a visible spectrum and a non-visible spectrum that is incident on the first photodiode array;
receiving a second output from a second photodiode array that is proportional to light in the non-visible spectrum that is incident on the second photodiode array;
determining the lighting conditions based on the first output and the second output; and
adjusting the first output used to determine the lighting conditions based on detecting that the first photodiode array includes a shadowed region.

11. A method of detecting lighting conditions, the method comprising:
detecting, using a first photodiode array, light in a visible spectrum and a non-visible spectrum that is incident on the first photodiode array;
detecting, using a second photodiode array, light in the non-visible spectrum that is incident on the second photodiode array;
determining, using a processor, the lighting conditions based on a first output of the first photodiode array and a second output of the second photodiode array; and
adjusting, using the processor, the first output used to determine the lighting conditions based on detecting that the first photodiode array includes a shadowed region.

12. The method according to claim 11, wherein the first output is proportional to the light in the visible spectrum and the non-visible spectrum that is incident on the first photodiode array and the second output is proportional to the light in the non-visible spectrum that is incident on the second photodiode array.

13. The method according to claim 11, further comprising the processor determining a difference between the first output and the second output, the difference being based on a subtraction of the second output from the first output.

14. The method according to claim 13, wherein the processor determines the difference as the subtraction of the second output, multiplied by a second factor, from the first output, multiplied by a first factor, the first factor and the second factor being determined based on a factor calibration process.

15. The method according to claim 13, further comprising the processor detecting that the first photodiode array includes the shadowed region based on the difference being zero or a negative value.

16. The method according to claim 13, further comprising the processor determining an illuminance in lumens per square meter (lux) based on the difference between the first output and the second output and outputting the illuminance as the lighting conditions unless the processor detects that the first photodiode array includes the shadowed region.

17. The method according to claim 16, further comprising the processor detecting that the first photo diode array includes the shadowed region based on a ratio of the second output to the illuminance exceeding a ratio threshold.

18. The method according to claim 17, further comprising the processor detecting that the first photodiode array includes the shadowed region based additionally on the second output exceeding an output threshold.

19. The method according to claim 11, wherein the processor adjusting the first output includes the processor setting the first output as a ratio of the second output to an artificial ratio.

20. The method according to claim 19, further comprising determining the artificial ratio based on a ratio calibration process.

* * * * *